July 30, 1929.  R. HORTON  1,722,420
CONTROL FEED FOR FILLING MILK BOTTLES
Filed May 11, 1928  5 Sheets-Sheet 5
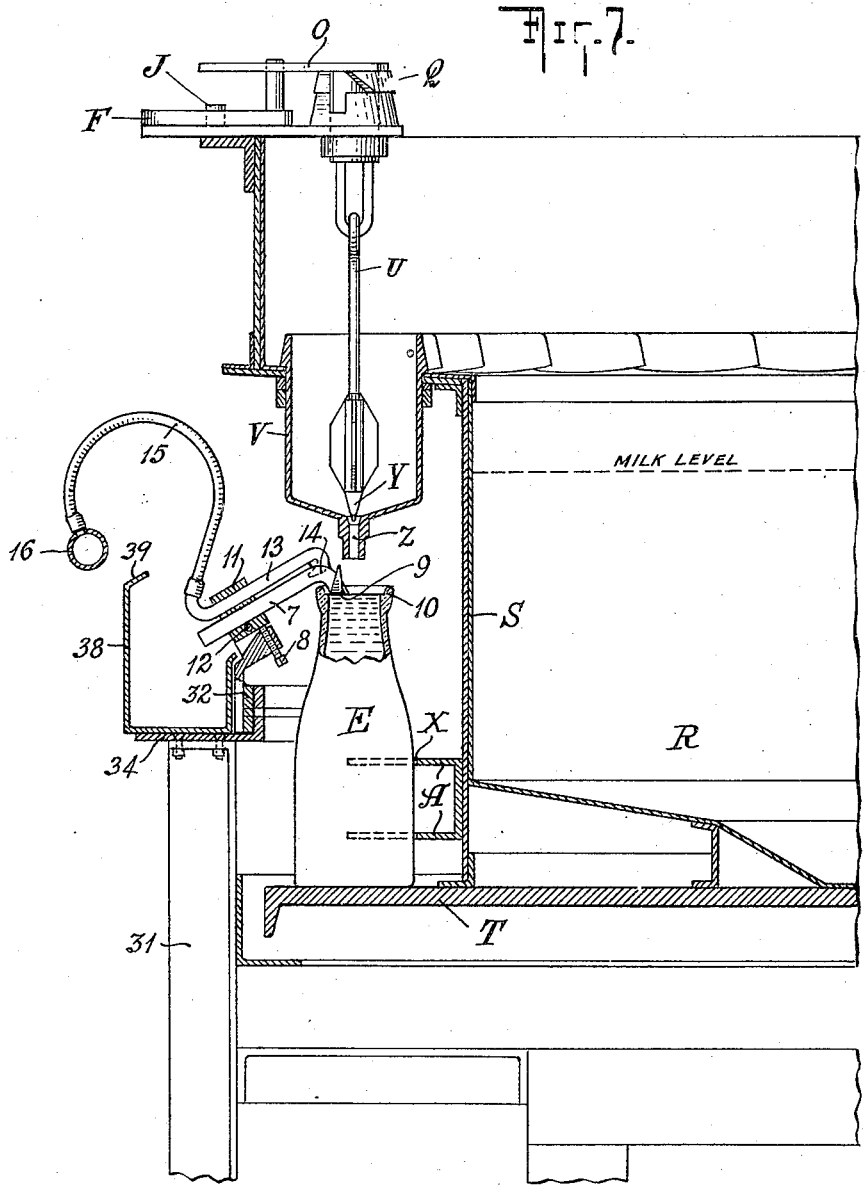
WITNESS
G. V. Rasmussen
INVENTOR
RALPH HORTON
ATTORNEYS Patented July 30, 1929.

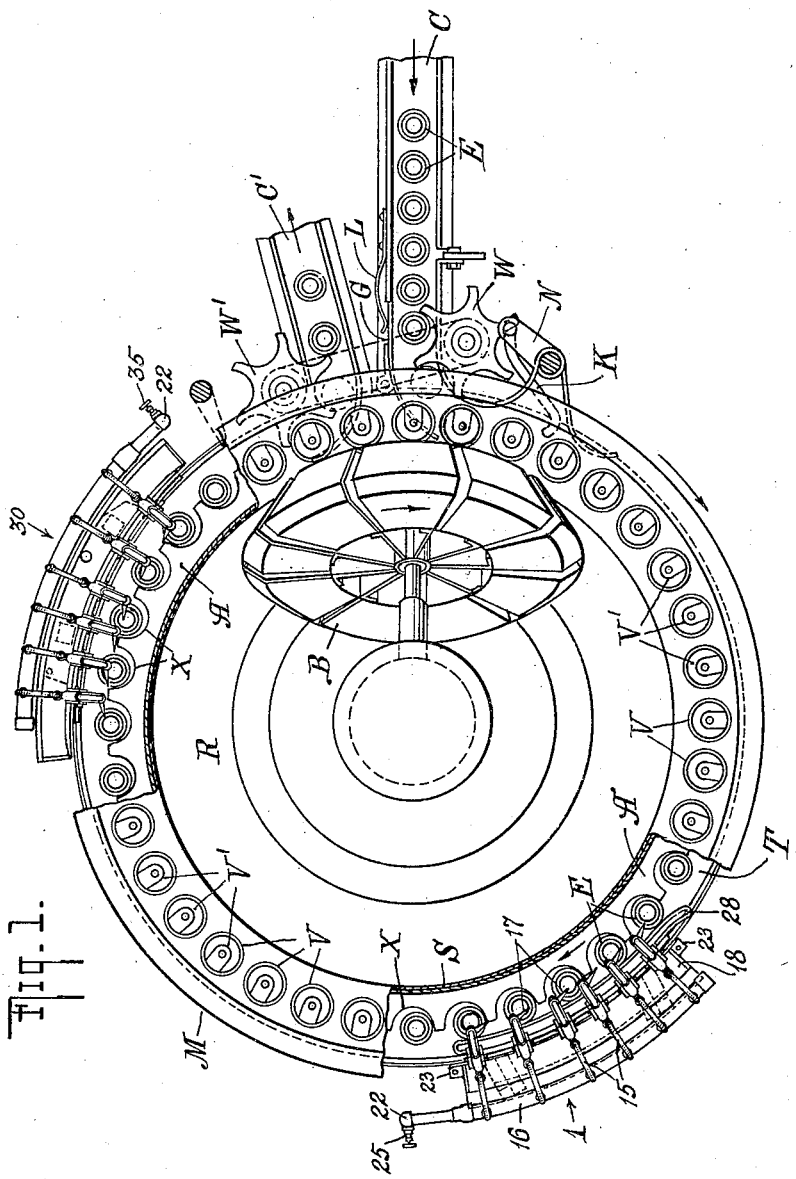

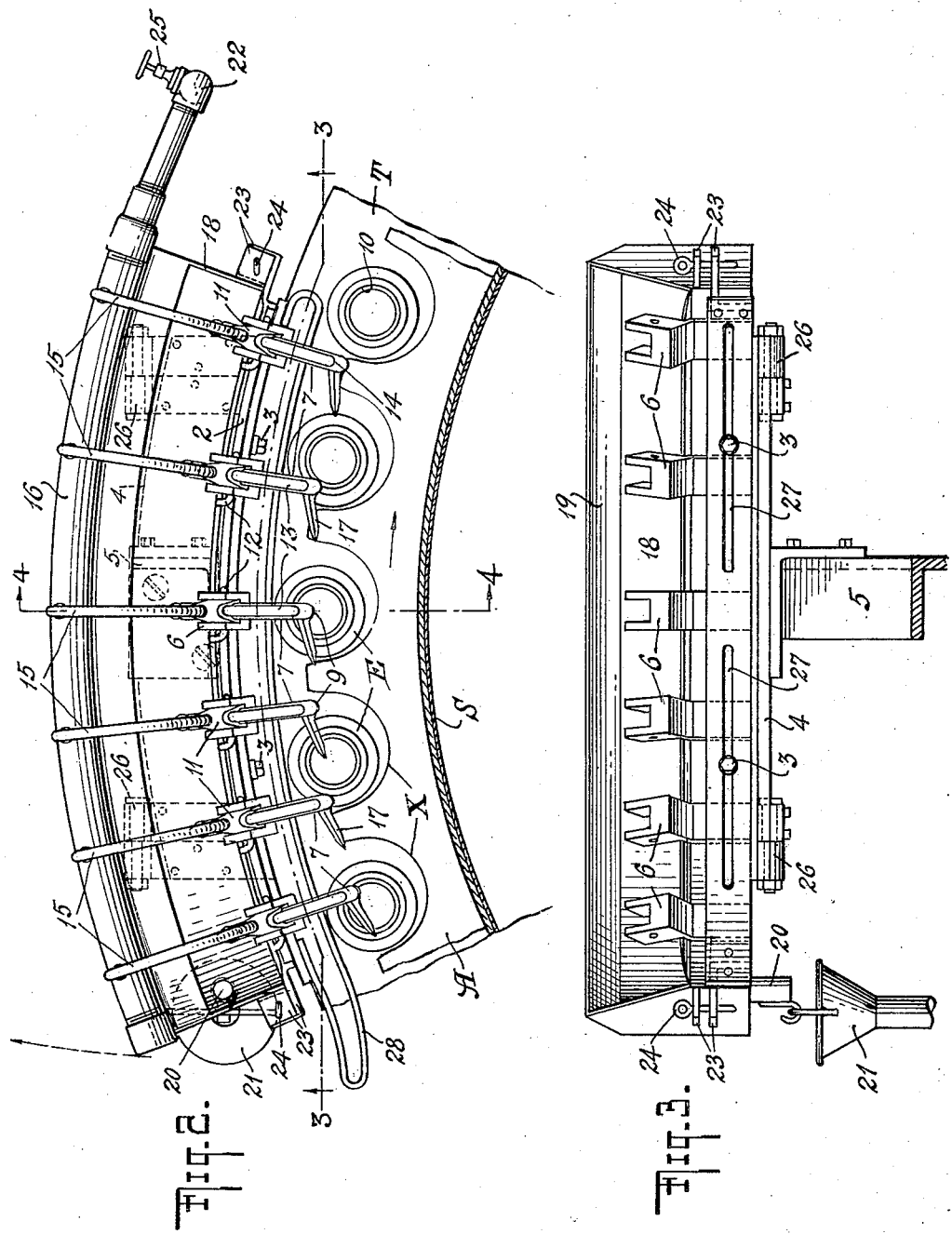

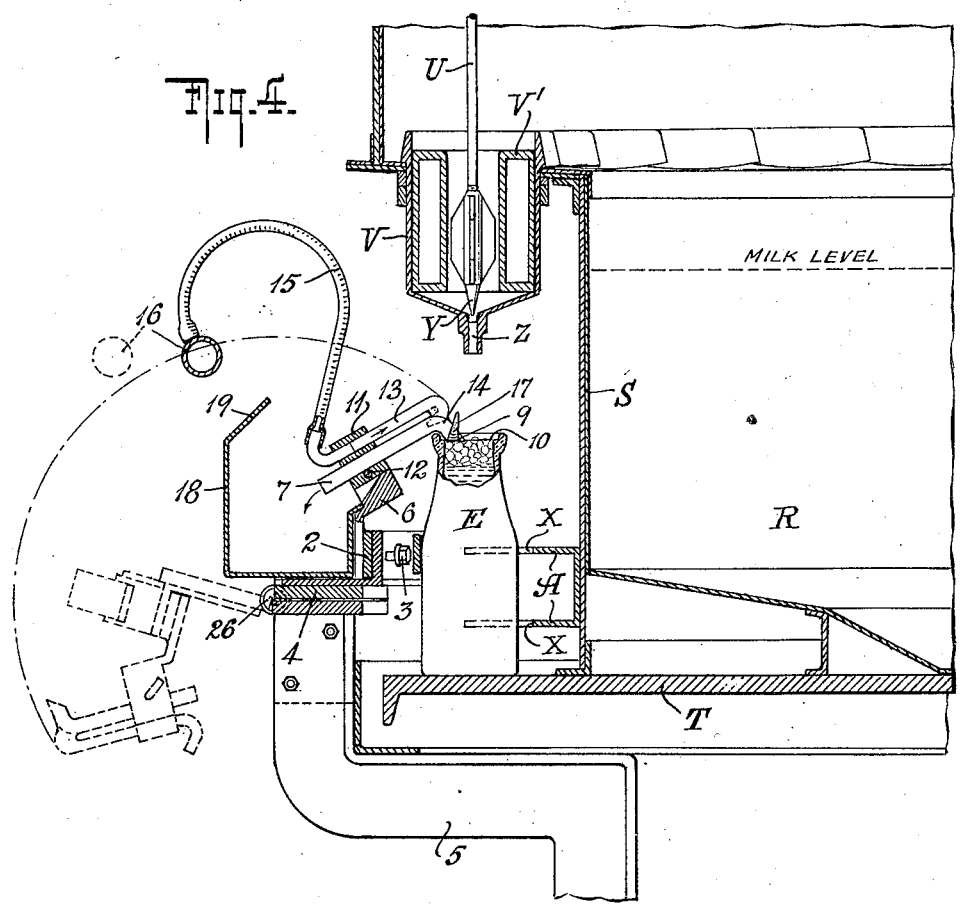

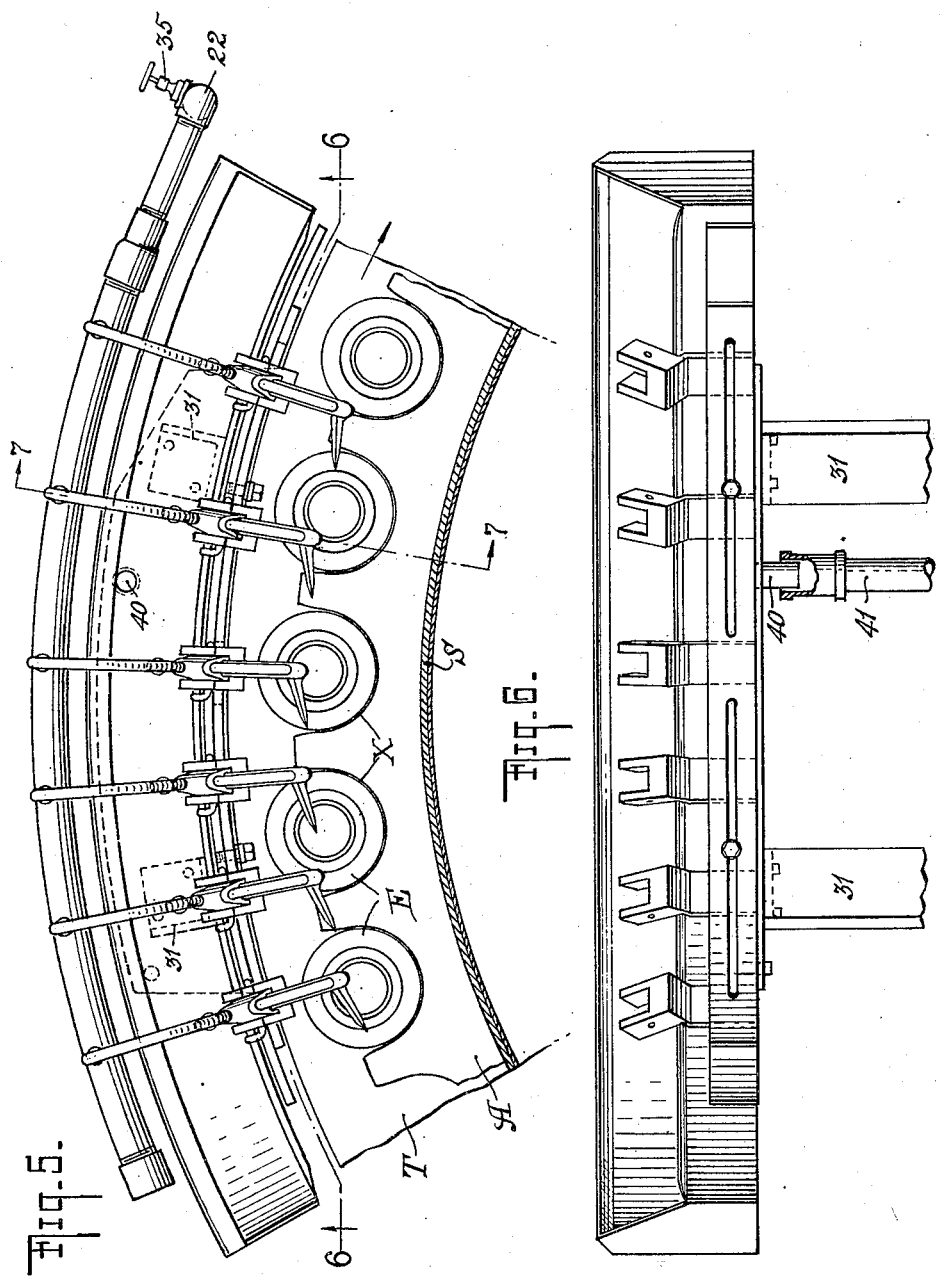

1,722,420

UNITED STATES PATENT OFFICE.

RALPH HORTON, OF ALLENHURST, NEW JERSEY.

CONTROL FEED FOR FILLING MILK BOTTLES.

Application filed May 11, 1928. Serial No. 276,835.

This invention relates to filling machines, and more particularly to automatic apparatus adapted to fill a container with a liquid having a tendency to foam so that the container is neither overfilled nor underfilled.

In filling a container with liquid which has a tendency to foam, a great deal of trouble has been experienced in trying to fill the container properly without overfilling or underfilling. My invention is particularly applicable to the filling of milk bottles in connection with which my improved apparatus presents particular advantages. When bottles are charged with milk particularly in an automatic filling machine, some of the milk is converted into foam. Milk has a distinct tendency to foam when being poured from one vessel to another. Under certain conditions this tendency is aggravated so that a substantial part of the mass in the bottle is constituted of foam instead of liquid. This is particularly the case when milk is first introduced into a bottle in a filling machine. The foam constitutes a substantial portion of the height of the milk in the bottle, and as the milk progressively fills the bottle the column of foam rises. Due to the decrease in cross-sectional area of the bottle near its neck the foam column rapidly grows in height and reaches the top of the bottle long before the proper amount of liquid milk has been introduced into the bottle. During the remainder of the filling operation, milk will foam over the top of the bottle and will be lost. The bottle, just prior to being discharged from the filling machine, contains a column of milk on the top of which a body of foam is floating. In one apparatus of the present art, as the bottle (which has been charged with a measured quantity of milk) is discharged from the machine it passes under a milk-removing device which withdraws or sucks off the portion of the milk extending from the top of the bottle to a little below the sealing seat. If there is present remaining foam, still floating upon the top of the milk, it breaks and changes into a liquid condition, and the bottle is underfilled. The bottle, in the underfilled condition, is immediately sealed with a disk applied to the sealing seat by an automatic capping machine located at the discharge terminal of the filling machine. After sealing, the bottles are transported on traveling conveyors to a table where the delivery cases are filled. These cases are then subjected to an inspection before being sent to the shipping department. All of the underfilled bottles must then be re-opened, supplied with additional milk, and finally re-sealed with a hand operated sealing apparatus. It is obvious that this is a cumbersome procedure which is very inefficient, time-consuming, and highly objectionable. When the milk foams badly the number of bottles which have to be re-opened, re-filled and re-capped is relatively great. If, on the other hand, the bottle is overfilled, and the milk-removing device does not act quickly enough to lower the milk level to below the sealing seat, the application of the sealing disk bursts the bottle.

The present invention has as one of its objects the elimination of the disadvantages of automatic filling machines now in use.

Other objects and advantages of the invention will become apparent from the following description taken in conjunction with the accompanying drawings, in which:

Fig. 1 represents a plan view of an automatic filling machine of a type now in use with two preferred embodiments of my invention applied thereto, certain parts being omitted and certain parts being broken away for the sake of clarity;

Fig. 2 is an enlarged plan view of the embodiment of my invention shown in the lower left hand corner of Fig. 1 and intended to handle pint bottles;

Fig. 3 is a sectional view taken on the line 3—3 of Fig. 2, parts being omitted for the sake of clarity;

Fig. 4 is a sectional view taken on the line 4—4 of Fig. 2;

Fig. 5 is a view similar to Fig. 2 of another embodiment of my invention shown in the upper right hand corner of Fig. 1, intended to handle quart bottles;

Fig. 6 is a view similar to Fig. 3 taken on the line 6—6 of Fig. 5;

Fig. 7 is a sectional view taken on the line 7—7 of Fig. 5.

Similar characters of reference designate similar parts throughout the specification.

Referring more particularly to Fig. 1, the letter M designates generally an automatic filling machine such as illustrated and described in United States Patent No. 1,483,861 issued to Samuel M. Heulings. In the drawings accompanying the present application only sufficient portions of Heulings's filling machine are illustrated as are needed to understand the present invention. Thus in Fig. 1, the filling machine M has a circular turn-table T which is supported in any well-known manner and which is rotated by suitable mechanism (not shown). Mounted upon the turn-table T is a tank structure S which contains a milk reservoir R, a plurality of peripherally disposed vessels V having a desired liquid content capacity, and a rotatable bucket wheel B dipping into milk contained in the reservoir and filling the vessels V with such milk.

A conveyor C cooperating with mechanism including a star wheel bottle feeder W and a guide G resiliently held by a leaf spring L feeds empty bottles E onto the turn-table T and to concave recesses X of a bottle rack A secured to the outside of the tank structure S. The bottles move with the turn-table and pass in wiping contact with a control arm K which controls an actuating member N. This member acts through associated mechanism (not shown) to move a control lever F which oscillates about stud J and thus turns a crank arm O to raise a valve control member Q (Fig. 7). When member Q is raised, link U and valve Y which are connected thereto are also raised to open a feed nozzle Z. After the turn-table has completed nearly one revolution a stop (not shown) strikes the outer part of crank arm O which thereupon turns and seats the member Q, and thus lowers valve Y and closes feed nozzle Z.

When pint bottles are filled in the filling machine heretofore described (which machine, as stated, is a prior art machine), I utilize my improved adjustable foam and liquid-removing device generally designated by the numeral 1 for accomplishing the objects of my invention. This device has a carriage 2 which is adjustably secured to a frame 4 by the bolts 3 fitting in slots 27. The frame is bolted to and projects from a standard 5 of the filling machine. Mounted upon the carriage 2 are a plurality of arms 6 which carry suckers 7. The number of suckers and the spacing thereof may be varied to meet any particular conditions, but I have found it preferable to employ five or six suckers and to increase progressively the space between adjacent suckers.

An adjusting device 8 (see particularly Fig. 7) is provided for each sucker to raise or lower the mouth 9 thereof, and, thereby vary the depth to which the sucker and its associated cam 17 projects into a milk bottle E. In practice I have found it advisable in some cases, especially if the foam forms in great volume, to adjust the first sucker to the greatest depth and to decrease progressively the depth to which each successive sucker extends into the bottle, and to arrange the last sucker or two to extend into the milk bottle only to such a depth that the milk, after the removal of excess milk and foam, occupies a level slightly below the sealing seat 10 of the bottle.

The suckers may be of any appropriate construction, but I prefer to use those of the rocker type with an air blast or eductor. In this type a block 11 carrying the sucker is pivoted in arm 6 by means of a pin 12 so that it may rock up and down. Extending through the block above the sucker is an air tube 13 the outer end of which penetrates a wall of the sucker and terminates in a nozzle 14 just above the mouth 9, and the inner end of which is preferably curved upwardly and is connected with a flexible air tube 15 made, for example, of rubber or the like. This tube is joined in any suitable manner to a feed pipe 16 which supplies air from a valved supply pipe 22 to the air tube for the purpose of creating a vacuum or suction in the sucker in the well-known manner, and thereby withdrawing the milk and foam from the bottle being filled.

In order to catch and to collect the withdrawn milk a catch pan 18 is attached in any appropriate manner, such as by lugs 23 and pin 24, to the carriage 2. The catch pan may have any convenient shape but I have illustrated it as substantially rectangular in cross-section with a slanted splash plate 19 extending from the outer upper edge thereof for preventing the splashing and spattering of milk. The milk collected in the pan is drained to one corner where an outlet 20 is provided to carry off the milk to a discharge funnel and pipe 21.

When the filling machine is operating, the bucket wheel B rotates and scoops milk from reservoir R and fills the vessels V in the manner explained in the patent referred to. The valves Y of these vessels, as explained heretofore, are opened when control arm K makes a wiping contact with the empty bottles carried by the turn-table T and occupying the recesses X of the bottle rack A. As each valve is opened the milk flows out of the corresponding vessel as a jet or stream of about one-quarter of an inch in diameter. This stream rushes into the bottle underneath the vessel and strikes the bottom of the bottle with sufficient force to be broken up into a spray and a mass of foam. The bottle is progressively filled as the turn-table T rotates, and the milk therein has floating thereon a mass of foam. As the bottle fills with milk, the column of milk rises, and thus carries the foam into the upper part of the bottle. Due to the fact that the cross-section of the bottle decreases in such upper part the column of foam rapidly grows in height and rises above the sealing seat long before the column of unfoamed milk reaches such seat. I so adjust the position of the first sucker that it comes into action at about the time the foam, under most disadvantageous conditions, rises above the sealing seat, i. e. the cam then makes contact with and rises over the top of the bottle, and thereby introduces the mouth of the sucker into the bottle. The adjustment of the sucking apparatus to the desired position is accomplished by means of slots 27, heretofore described, through which bolts 3 adjustably secure the carriage 2 to the frame 4. When it is desired to advance or retard the position of the suckers, it is necessary only to adjust the carriage 2 into position, as the suckers and drip pan are supported on said carriage and move together therewith as one unit. Air under pressure from supply pipe 22 is introduced into the distributing pipe 16 and then to the connecting tubes 15 and air pipes 13 into the interior of the suckers 7 where it creates a suction effect which causes the withdrawal of some or all of such foam as has risen above the sealing seat. The cutting action of the cam and sucker may, and often does, break down some of the foam. The bottle continues to move with the turn-table and continues to be filled with milk from its filling vessel. The sucking operation is repeated by the succeeding suckers until the bottle is filled with non-foamed milk up to, but not above, the sealing seat and no milk remains to be introduced into the bottle. Of course, any non-foamed milk which may at any time rise above the sealing seat is also removed by one or more of the suckers. In practice the first one or two suckers may not suck up any foam, as their position is so adjusted that they may be ready for action in any case of unusual or excessive foaming; the suckers last in the series may be spaced farther apart than those earlier in the series (see f. i. Figs. 2 and 3, and 5 and 6) as the milk, during the last stages of the filling operation, foams less copiously. While the pint bottles are being acted on by my device a resilient guide 28 aligns and keeps the bottles in proper position on the turn-table. Each of the bottles after passing the last sucker is ready to be sealed and, after being carried on the turn-table to the discharge star wheel W', is removed from the filling machine and transported by a traveling conveyor C' to a sealing machine (not shown).

When the machine is to be used for filling quart bottles the air operating the suckers of device 1 is shut off by valve 25. The drip pan 18 may then be removed, the pipe 16 swung entirely out of the path of the suckers, and carriage 2 swung around hinge 26 so as to occupy an inoperative position, as shown by the dotted lines, and to be out of the path of the quart bottles. These bottles are then fed by the conveyor C to the machine which, after the removal of filler blocks V', will be in an operative condition for measuring quarts.

My improved device for quart bottles is designated generally by the numeral 30 (Figs. 1 and 5) and is constructed in the same way as the pint device 1. Due to the fact that quart bottles are larger than pint bottles I position the device 30 on standards 31 at a higher level than the pint device 1. The drip pin 38 differs from drip pan 18 (used when filling pint bottles) in that the former supports only the suckers, the drip pan being stationary. All of the parts of the quart device and their functions and arrangement are the same as that of the pint device which has been described fully heretofore. It is to be noted, however, that no hinge 26 is required for the quart device since the suckers thereof are higher than the pint bottles and do not interfere with the operation of the machine when pint bottles are being filled.

In operating with quart bottles I have found that there is greater tendency to foaming than there is when pint bottles are filled. With the use of my device, however, the quart bottles are adequately accommodated and are not overfilled.

My invention enables me to solve the problem which arises in connection with the use of automatic filling machines when filling a liquid into containers, and particularly when filling milk into glass bottles, in connection with which operation such problem is accentuated, namely the filling of the container to a predetermined level, no less and no more, and the avoidance of waste by spilling.

It is not always practicable so to operate a filling machine as to have each measuring device discharge exactly the same quantity of milk. Even if it were practicable to discharge at each filling operation exactly the same quantity of milk, this would not solve the problem as milk bottles are not so accurately made that the space enclosed thereby, calculated up to the sealing seat, is always the same, although the height of the bottle at the sealing seat is practically always the same. If it were possible to discharge exactly a quart of milk into each so-called quart bottle, it would be found that some bottles are not filled to the sealing seat because they hold more than a quart and that some would be overfilled as they hold less than a quart. Even if the bottle held exactly a quart the loss due to overflowing foam would cause the bottle to be underfilled. The underfilling of bottles, even to a slight degree, leads to a serious complaint from customers who believe that they are being given short measure, while the overfilling of bottles results in the bursting of the bottle when the seal is applied. The most serious problem, however, is that due to the unpredictable behavior of milk when filled into bottles. Under some conditions a very large amount of foam is formed while under others only a comparatively small amount of foam is formed, although in any event so much foam is formed as to lead to serious losses if permitted to overflow the bottle during the filling operation. If, for instance, milk when being filled is at a temperature of 38° F., as required by some health authorities, and the bottle has recently been washed in hot water, a great amount of foam is formed even though the bottle has been rinsed in cold water. The room temperature which is different at different times of the year, has its effect on the amount of foam produced. Barometric pressure may also have an influence on foaming. Milk produced at different seasons of the year, owing probably to difference in food, produces different proportions of foam.

By the use of my invention wastage by spilling of foam and overfilling is prevented. In order that the best results may be obtained by the use of my apparatus so that underfilling is also prevented, the quantity of milk to be fed to each bottle should be larger in amount than that which should be filled into the bottle of largest capacity, and my invention therefore contemplated for optimum results the deliberate overfilling of each and every bottle, the overfilling of the bottles of largest capacity being arranged for primarily in order to allow for the loss of milk by the withdrawal of the foam. My apparatus, if properly constructed, arranged and operated, makes commercially practicable this deliberate overfilling of every bottle, as it removes and preserves in a sanitary condition the overflowing foam and whatever milk may rise above the sealing seat.

In view of the many different conditions which have to be met with in operating a milk filling machine, and particularly the unpredictable behavior of the milk with respect to foaming, it is impossible to lay down any precise rule for spacing the suckers from one another or for adjusting the depths to which the various suckers are introduced into the bottle, or even for the number of suckers that may be necessary or advisable. Generally speaking, foaming conditions are more stable in pint bottles than in quart bottles, and for the former the suckers may be adjusted to about the same depth. When the foaming is very heavy, the suckers that first go into operation should be arranged to remove the foam at a lower level than would otherwise be necessary, so that by commencing removal of foam as soon as possible, overflowing is prevented as much as possible or altogether. However, a reasonably careful operator can readily adjust the depths and the spacings so as to bring about the desired result either completely or with reasonable approximation, namely preventing any overflow of foam and having the milk level just slightly below the sealing seat when the bottle reaches the sealing apparatus.

I am, of course, not limited to the number, size, construction and arrangement of the suckers. If, for instance, milk should be foaming heavily and there is still an appreciable amount of foam left in the bottle after the last sucker of the series has operated thereon, I may arrange an additional sucker anywhere between such "last" sucker and the capping machine to withdraw the additional liquid formed by the collapse of the foam. If, on the other hand, I should find that such "last" sucker, although arranged to draw down the level to just below the sealing seat, in fact draws the liquid milk to below such level and the foam which subsequently collapses does not bring the milk to the desired level, I may raise such "last" sucker slightly and then count upon such additional sucker to draw the milk down to the desired level. Of course, in either event, such additional sucker should be arranged at a point of the travel of the bottle at which substantially all the foam has collapsed into liquid milk.

I claim:

1. In combination with an automatic filling mechanism in which a container is filled while traveling on a conveyor, a plurality of liquid removing devices arranged along the path of said container, inlet openings in said liquid removing devices, said openings being adapted to be disposed at different levels in said container.

2. In combination with an automatic filling mechanism in which a container is filled while traveling on a conveyor, a plurality of liquid removing devices arranged along the path of said container, inlet openings in said liquid removing devices, said openings being adapted to be disposed at different levels in said container, said devices being adjustable to vary the extent to which they enter the container.

3. In combination with an automatic filling mechanism in which a container is filled while traveling on a conveyor, a plurality of liquid removing devices arranged along the path of said container, inlet openings in said liquid removing devices, said openings being adapted to be disposed at different levels in said container, and a catch-pan into which said devices discharge.

4. In combination with an automatic filling machine in which containers may be filled while traveling on a conveyor, a series of liquid removing devices arranged along the path of said containers, each adapted to withdraw liquid from a container of a certain height, and a second series of liquid removing devices arranged along the path of said containers in advance of the first series, adapted to withdraw liquid from containers of lesser height, said second series of liquid removing devices being movably mounted on said machine in such a manner as to be capable of being withdrawn from the path of the containers of greater height.

5. A method of filling a bottle with milk, which comprises continuously filling milk into such bottle, periodically withdrawing foam from such bottle and any liquid milk which rises above predetermined heights in such bottle as it rises above said heights and finally withdrawing any milk which may have risen above the height at which the milk is to stand in the bottle when the latter is being sealed.

6. A method of filling a bottle with milk which comprises segregating a quantity of milk greater than that which such bottle is adapted to contain when sealed, filling said quantity of milk into such bottle, periodically withdrawing foam from such bottle as the same rises therein and then, while continuing to fill milk into the bottle, periodically withdrawing any foam or liquid milk which rises above predetermined heights in such bottle as it rises above said heights and finally withdrawing any milk which may have risen above the height at which the milk is to stand in the bottle when the latter is being sealed.

RALPH HORTON.